J. SHEPHARD.
LIQUID GAGE.
APPLICATION FILED JUNE 15, 1920.

1,383,866.

Patented July 5, 1921.
2 SHEETS—SHEET 1.

Inventor
James Shephard
By Lancaster and Allwine
Attorneys

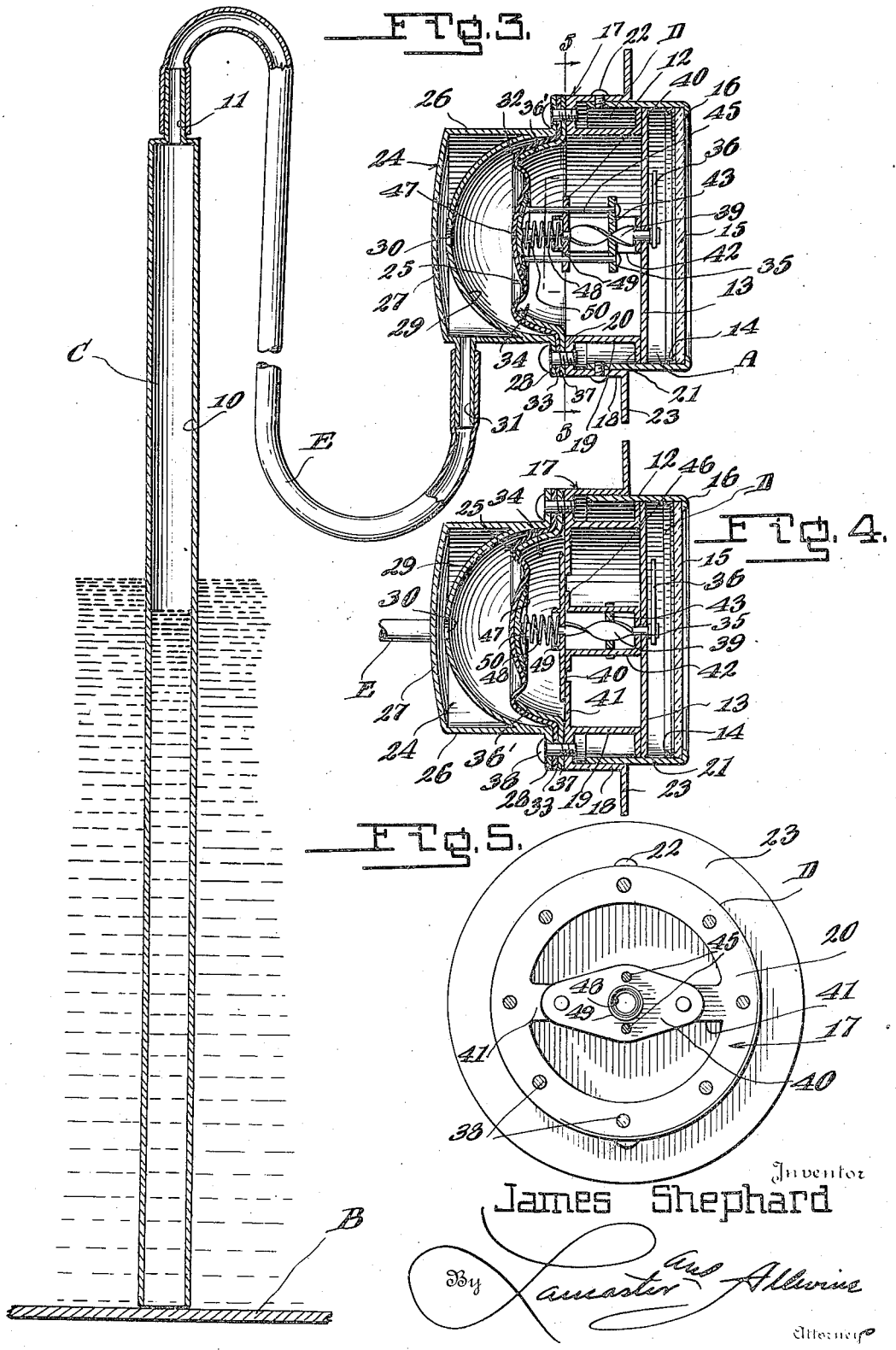

UNITED STATES PATENT OFFICE.

JAMES SHEPHARD, OF DETROIT, MICHIGAN.

LIQUID-GAGE.

1,383,866.   Specification of Letters Patent.   Patented July 5, 1921.

Application filed June 15, 1920. Serial No. 389,160.

*To all whom it may concern:*

Be it known that I, JAMES SHEPHARD, a citizen of the United States, residing at Detroit, in the county of Wayne and State of Michigan, have invented certain new and useful Improvements in Liquid-Gages, of which the following is a specification.

This invention relates to gages and one of the primary objects of the invention is to provide an improved liquid gage which is particularly adapted for use in connection with the fuel supply tanks and crank cases of engines of motor vehicles, but which is susceptible for use with other types of storage tanks and receptacles and which is so constructed that the amount of liquid contained therein can be easily and accurately determined at all times.

Another object of the invention is to provide an improved liquid gage which can be either embodied as a permanent fixture for a tank or as a portable fixture therefor.

A further prime object of the invention is to provide an improved liquid gage which when used as a permanent fixture is so constructed that the indicating portion thereof can be located at a point distant from the tank or other receptacle containing the liquid and positioned at a place where the same can be conveniently read at all times, so that the necessity of going directly to the tank or other receptacle to see the amount of liquid contained therein is obviated.

It has heretofore been the practice to incorporate a liquid gage directly on the storage tank which made it necessary to go directly to the tank when it was desired to see the amount of liquid contained therein. This practice was decidedly impractical as in motor vehicle construction the fuel tanks thereof are often located at inconvenient points, such as underneath the driver's seat or at the rear end of the chassis. It is therefore another object of the invention to provide an improved gage in which the indicating portion thereof can be positioned on the instrument board irrespective of the position of the tank so that the same will be within the sight of the driver of the vehicle at all times.

A further object of the invention is to provide an improved gage which can be used as a portable accessory for cars in which the fuel tanks thereof are not equipped with indicating gages such as cars of the Ford type and which is so constructed that the same can be conveniently carried in the tool chest or the like.

A further object of the invention is to provide an improved liquid gage embodying an indicating member arranged to be operated by air pressure, an air containing cylinder adapted to be positioned directly in the storage tank or other receptacle so that the air contained therein will be affected by the amount of liquid in the tank or other receptacle and an air conveying member connecting the air cylinder and the indicating member together so that the air in the cylinder will act on the indicating member and operate the same.

A further object of the invention is the provision of a pneumatically operated liquid gage embodying a diaphragm sensitive to air pressure for actuating the operating mechanism of the indicating pointer and an improved guide ring arranged in such relation to the diaphragm that the same will move only in a straight path whereby a direct thrust will be transmitted to the operating mechanism of the indicating pointer.

A still further object of the invention is to provide an improved liquid gage of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Fig. 3 is a similar view showing the gage in operation, and the diaphragm being operated by air pressure.

Fig. 4 is a sectional view through the indicating portion of the gage taken at right angles to Fig. 3, and Fig. 5 is a cross section taken on the line 5—5 of Fig. 3.

Figure 1:
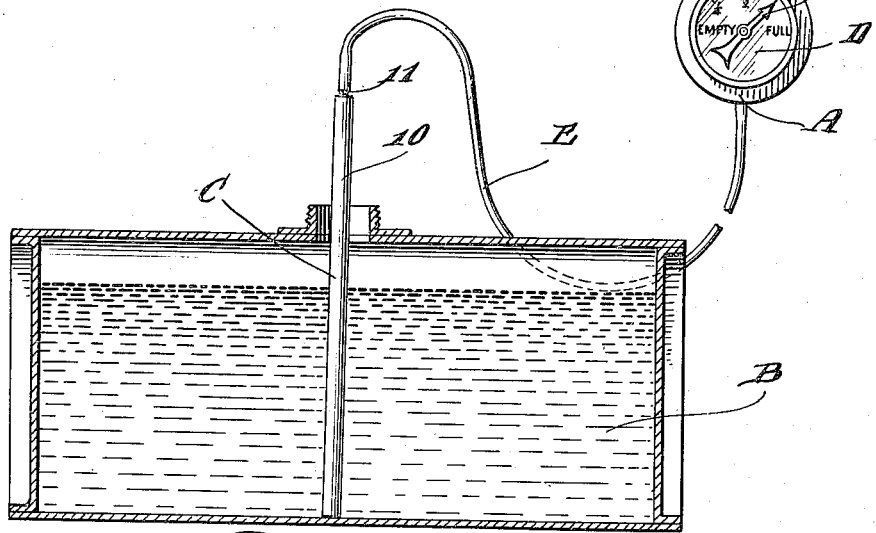
Figure 1 is an elevation of the improved gage showing the same in operative position in relation to a supply tank, the tank being shown in section.
Figure 2:
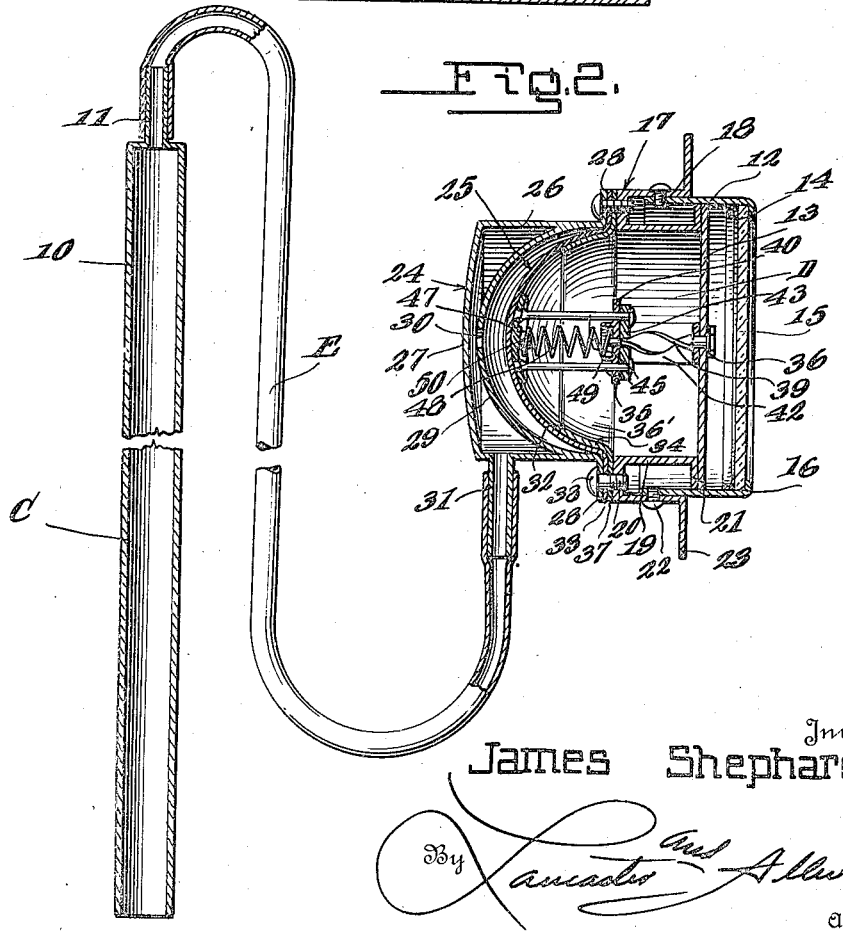
Fig. 2 is an enlarged section through the improved liquid gage.

Referring to the drawings in detail, wherein similar reference characters designate corresponding parts throughout the several views, the letter A generally indicates the improved liquid gage, and B a tank with which the same is associated. The tank B is shown merely for the purpose of illustration and the same may be of any type, size or style.

The improved gage A includes the air containing member C, the indicating member D and the air conveying member E.

The air containing member C consists of a cylinder 10, the upper end of which is provided with a reduced nipple 11. The lower end of the cylinder is left open so as to permit the entrance of liquid into the same. While in the drawings the cylinder 10 has been shown relatively long and with a small diameter it is to be understood that the dimensions of the cylinder are to be varied in accordance with the type of tank with which the same is to be used. Thus if the gage is to be used with a broad shallow tank, the cylinder will be formed short with a relatively large diameter.

The air operated indicating member D comprises a cylindrical shell 12, in which the dial plate 13 is positioned. An annular supporting ledge 14 is arranged in front of the dial plate 13 and supports the protecting glass 15 therefor. The outer end of the shell 12 is also provided with an angular inwardly extending annular retaining flange 16 which engages the outer surface of the glass 15 and holds the same in place against accidental displacement.

A casing 17 is provided for supporting the dial plate 13 and this casing 17 includes the straight concentrically arranged inner and outer walls 19 and 18. These walls 18 and 19 are connected at their rear edges by a rear wall 20. The inner wall 19 is provided with a right angular extending annular flange 21 which engages the inner face of the cylindrical shell 12, which is positioned between the walls 18 and 19. As shown the outer surface of the shell 12 engages the inner surface of the outer wall 18 and projects outwardly from the casing. The cylindrical shell 12 and the dial supporting casing 17 are held in position against accidental displacement by means of fastening elements 22. The right angular extending annular flange 21 forms a seat upon which is adapted to rest the dial plate 13 and the dial plate may be secured to this seat in any preferred manner. The outer wall 18 has its forward end provided with the outwardly extending right angular flange 23 which may constitute the means for securing the indicating portion B of the device in position on a suitable support. The rear end of the dial supporting casing 17 carries the rear casing 24 for the diaphragm 25, which will be hereinafter more fully described. The casing 24 of the diaphragm 25 consists of the outer wall 26 and the rear wall 27. The outer cylindrical wall 26 is provided with an angular fastening flange 28 which extends in concentric relation to the rear wall 20 of the casing 17. The casing 24 carries a substantially semi-spherical partition 29, which is provided with an axial opening 30 through which the air is adapted to flow. An outwardly extending nipple 31 is carried by the cylindrical wall 26 and communicates with the interior of the casing.

The diaphragm 25 is sensitive to air pressure and may be formed of any suitable material that is impervious to fluid such as leather or the like. This diaphragm 25 includes the flexible semi-spherical body 32 and the angular outwardly extending annular flange 33 which is arranged in concentric relation to the flange 28 and the rear wall 20 of the casing 17. The diaphragm 25 is positioned directly in front of the partition wall 29 and when air pressure is admitted into the casing 24 the air is adapted to flow through the opening 30 and act on the said diaphragm, which will force the same inwardly.

An annular guide ring 34 of special construction has been provided for the diaphragm so as to insure that the central opposite portion thereof will move inwardly in a straight line so that the operating mechanism 35 for the dial pointer 36 will receive a direct thrust therefrom. The guide ring 34 includes the annular transversely curved body 36' which conforms to the configuration of the semi-spherical body 32 of the diaphragm 25. The body 36' is provided with an annular attaching flange 37 which is arranged in concentric relation with the rear wall 20 of the casing 17, the flange 28 formed on the casing 24 and the flange 33 formed on the diaphragm 25. Suitable fastening elements 38 are provided for extending through the parts so as to hold the same in position against accidental displacement. The provision of the flange 33 on the diaphragm 25 and its arrangement between the flange 28 and the flange 37 forms an air tight connection and absolutely prevents the escape of air between the diaphragm and the casing 26. If so desired other gaskets may be inserted between the flange 28 and the wall 20 for rendering the joint airtight, or this joint may be connected in any other preferred manner.

The operating means 35 for the dial pointer 36 consists of a spiral rod 39 which has its terminals rounded and mounted in suitable bearings provided in the dial plate 13 and the transversely extending cross bar 40. This cross bar 40 has its terminals secured to suitable ears 41 formed on the inner surface of the dial supporting casing 17. A U-shaped guide 42 is provided for guiding the sliding operating plate or nut 43 in its movements up and down on its spiral rod 39.

It can be seen that when the plate or nut 43 is moved up or down on the spiral rod 39 the latter will be rotated. The extreme outer end of the spiral rod 39 has secured thereto the dial pointer 36 and it can be seen that when the rod is turned the pointer will be moved over the face of the indicating dial plate 13 which may have suitable markings 44 thereon so that the user can read the amount of liquid contained in a tank. The operating plate or nut 43 has its terminals extended beyond the U-shaped guide 42 and has secured thereto the rearwardly extending guide rods 45 which are slidably mounted in the transversely extending guide plate 40. The terminals of the legs of the U-shaped guide member 42 are provided with outwardly extending feet 46, which are secured in any preferred manner to the transversely extending guide plate 40. The extreme inner end of the guide rods 45 have secured thereto in any preferred manner the substantially concavo-convex plate 47 which is adapted to be normally held in engagement with the inner surface of the diaphragm 25 by means of an expansion spring 48, one terminal of which is fitted in a socket 49 carried by the plate 40. The other terminal is coiled around a pin 50 carried by the operating plate 47. It can be seen from this construction that when air pressure is emitted into the casing 24 and flows through the opening 30 the diaphragm 25 will be pushed inwardly which will move the concavo-convex plate 47 therewith, which will in turn push in on the operating plate or nut 43 and rotate the rod 39 and thus move the pointer 36.

The air conveying member E is adapted to convey the air from the cylinder C to the casing 24 and this air conducting member is of tubular formation and is preferably formed of flexible or elastic material such as rubber tubing. The terminals of this tubing as shown are stretched over the nipples 11 and 31 respectively and are adapted to form an air tight joint at each of these points.

In the use of the improved apparatus when it is desired to know the amount of fluid in a tank the usual cap is removed from the filling opening and the cylinder 10 is inserted into the same. The fluid entering the cylinder 10 will compress the air therein and force the same through the air conveying member E into the casing 24 where the same will flow through the opening 30 as heretobefore described and operate the pointer 36. It can be seen that the air will be compressed according to the amount of liquid contained in the tank and thus operate the pointer 36 more or less according to this amount.

Thus it can be seen that the device is particularly adapted for cars in which no gage is provided for the supply tank and the use of this gage entirely eliminates the necessity of dipping a rule or rod into the tank to see to what height the same is wet by the fluid. By inserting the cylinder 10 into the tank the amount of fluid in the tank can be instantly determined.

Changes in details may be made without departing from the spirit or scope of this invention; but,

I claim:

1. In a liquid gage, an air containing member arranged to permit the entrance of liquid into the lower end thereof, a pneumatically operated indicating member including an air tight casing, a dial plate, a movable pointer, a rotatable shaft carrying the pointer, a diaphragm arranged in the casing and operating means for said shaft engaging said diaphragm, and means connecting the cylinder with the air tight casing.

2. In a liquid gage, an air containing member arranged to permit the entrance of liquid into the lower end thereof, a pneumatically operated indicating member including an air tight casing, a dial plate, a movable pointer coöperating with the dial plate, a rotatable shaft carrying the pointer, a concavo-convex plate engaging the inner face of the diaphragm, means operatively connecting the rotatable shaft with the concavo-convex plate, spring means normally holding said concavo-convex plate in engagement with the inner surface of the diaphragm, and an air conveying tube connecting the upper end of the air containing member with the air tight casing.

3. In a liquid gage, an air containing member adapted to be positioned in a liquid container and arranged to receive the liquid into the lower end thereof, a reduced outlet nipple formed on the upper end of the air containing member, an airtight casing, a partition arranged in said casing having a relatively small opening formed therein, a dial plate, a movable pointer coöperating with the dial plate, a spiral rotatable shaft carrying said pointer, a flexible diaphragm arranged in the casing on one side of the partition plate, a concavo convex plate engaging said diaphragm, means operatively connecting the concavo-convex plate with the shaft, means normally holding the plate in engagement with the diaphragm, an inlet nipple communicating with the air tight casing on the side of the partition opposite to the diaphragm, and a flexible pipe connecting the nipples together.

4. In a liquid gage, an air containing cylinder adapted to be positioned in a liquid container and having a lower open end, and a reduced outlet nipple formed on its upper end, a pneumatically operated indicating device including an air tight casing, a dial plate, a pointer movable over said dial plate, a rotatable shaft carrying said pointer, a partition plate arranged in said casing having a centrally disposed air opening formed therein, a substantially semi-spherical diaphragm arranged in said casing, an inwardly extending guide ring for said diaphragm, a plate engaging the inner surface of the diaphragm at the central portion thereof, means operatively connecting the plate with the rotatable shaft, and an inlet nipple carried by the casing and communicating with the interior thereof, and a flexible conveying tube connecting the nipples together.

5. In a pneumatically operated gage, an air containing member having a lower open end, a reduced outlet nipple formed on the upper end, an air tight casing, a dial plate, a movable pointer arranged to coöperate with the dial plate, a spiral shaft rotatably mounted in said casing and carrying said pointer, a flexible semi-spherical diapragm arranged in said casing, a plate adapted to engage the inner surface of the diaphragm, means normally holding the plate in engagement with the diaphragm, a traveling nut on said spiral shaft, guide arms connecting the plate and the traveling nut together, an inlet nipple formed on said casing and a pipe connecting said nipples together.

6. In a liquid gage, an air containing cylinder having a lower open end, a reduced outlet nipple formed on its upper end, an air tight casing, a dial plate, a movable pointer, a rotatable spiral shaft carrying the pointer, a traveling nut arranged on said rotatable spiral shaft, a flexible diaphragm arranged in said casing, a plate arranged to engage the inner surface of the diaphragm, means normally holding the plate in engagement with the diaphragm, means rigidly connecting the plate with the traveling nut, an inwardly extending annular guide ring carried by the casing and arranged to engage the inner surface of said diaphragm around said plate, and a tube connecting the outlet nipple with the air tight casing.

7. In a liquid gage, an air containing cylinder having a lower open end, a reduced outlet nipple formed on its upper end, an air tight casing, a semi-spherical partition arranged in the casing having an air opening formed therein, an inlet nipple communicating with the interior of the casing, a dial plate, a movable pointer arranged to coöperate with the dial plate, a spiral shaft carrying the dial plate, a traveling nut on said spiral shaft, a semi-spherical diaphragm arranged in said casing, a guide ring including an annular transversely curved body arranged to extend in the casing and engaging the inner surface of said diaphragm, a substantially concavo-convex plate positioned axially in relation to said guide ring, means rigidly connecting the plate with the traveling nut, spring means normally holding the plate in engagement with the diaphragm, and a flexible air conveying member connecting the nipples together.

JAMES SHEPHARD.